United States Patent [19]

Dominico et al.

[11] Patent Number: 4,805,758

[45] Date of Patent: Feb. 21, 1989

[54] CROSSED TURRET CUP FEEDER

[75] Inventors: James Dominico, West Paterson; Paul Cino, Clifton; Carlos E. Fardin, Wayne, all of N.J.

[73] Assignee: Van Dam Machine Corporation, West Paterson, N.J.

[21] Appl. No.: 71,099

[22] Filed: Jul. 8, 1987

[51] Int. Cl.[4] .......... B65G 43/08

[52] U.S. Cl. .......... 198/444; 198/448; 198/464.2; 198/481.1; 198/572; 198/803.15; 414/798.4; 221/105

[58] Field of Search .......... 198/429, 430, 431–433, 198/444, 448, 463.2, 463.3, 464.2, 464.3, 468.01, 468.9, 479.1, 476.1, 477.1, 478.1, 479.1, 480.1, 481.1, 572, 575, 576, 578, 803.15, 406–409; 414/104, 105, 11; 221/104, 105

[56] References Cited

U.S. PATENT DOCUMENTS

| | | | |
|---|---|---|---|
| 1,132,268 | 3/1915 | Hobart | 414/105 X |
| 2,849,068 | 8/1958 | Frank et al. | 221/11 |
| 2,996,198 | 8/1961 | Packman | 198/429 |
| 3,352,435 | 11/1967 | Reinecke | 198/429 X |
| 3,491,633 | 1/1970 | White | 414/105 X |
| 3,938,697 | 2/1976 | Kinney | 221/11 |
| 4,000,709 | 1/1977 | Mojden | 221/11 |
| 4,066,218 | 1/1978 | Kamp | 221/11 X |

*Primary Examiner*—Robert J. Spar
*Assistant Examiner*—Lyle Kimms
*Attorney, Agent, or Firm*—Klauber & Jackson

[57] ABSTRACT

Apparatus for supplying rows of stacked frusto-conical cups to a feeding assembly of a cup printing apparatus includes a rotatable, hollow, crossed turret comprised of an outer turret section formed by four radially and equiangularly oriented connected tubes, and a central tubular section positioned centrally within the outer turret section, the crossed turret supplying a first row of stacked cups to the feeding assembly and automatically supplying a subsequent row of stacked cups in stacked relation on the first row after a level of the first row has decreased to a lower predetermined level and before a last cup of the first row has been supplied on a respective mandrel assembly of the cup printing apparatus; a rotary actuator which rotates the central tubular section; a motor driven assembly which rotates the outer turret section; a first sensor which senses when the level of the first row has decreased to the lower predetermined level to actuate the motor driven assembly to cause the outer turret section and central tubular section to rotate together by 90° to supply the subsequent row of stacked containers in stacked relation on the first row of stacked containers; a second sensor which senses when the level of the subsequent row has decreased to a higher predetermined level and supplying a signal to the rotary actuator to cause the central tubular section to rotate 90° with respect to the outer turret section so as to be oriented horizontally; and a pusher assembly which intermittently supplies rows of stacked containers to the crossed turret when the central tubular section has been rotated back to the horizontal position after the level of the subsequent row has decreased to the higher predetermined level.

7 Claims, 7 Drawing Sheets

CROSSED TURRET CUP FEEDER

BACKGROUND OF THE INVENTION

This invention relates generally to apparatus for decorating containers and, more particularly, is directed to apparatus for intermittently supplying rows of stacked cups to a feeding assembly of such a container decorating apparatus.

In general, a variety of machines for applying decorative finishes to plastic frusto-conical cups are known. Such machines include an intermittently rotatable mandrel wheel having a plurality of spaced, radially directed mandrels located on the periphery of the mandrel wheel for holding the cups thereon. Each cup is received on a corresponding mandrel at the loading station. Such machines conventionally include a feeding assembly which receives a stack of cups and feeds the cups one at a time onto each mandrel, as the mandrel wheel is rotated. The mandrels are then intermittently rotated with the mandrel wheel to a pre-treatment station, a printing station, a cure station and finally to an unloading station at which the cup thereat is removed from the respective mandrel. At the pre-treatment station, the plastic cup is subjected to a gas flame or electrical discharge which provides better adherance of the ink to the cup at the subsequent printing station. At the printing station, a printing blanket is brought into contact with each of the cups, to place a decoration on the outer frusto-conical surface thereof, and at the subsequent cure station, the ink is cured by ultraviolet light.

One such machine is sold by the assignee of the present invention, Van Dam Machine Corporation of West Paterson, N.J. under Model 560-COM. Such machine uses a mandrel wheel having eight mandrels spaced equally there around. In order to supply the cups to the feeding assembly, a carousel feeder is provided above the mandrel wheel. Specifically, the carousel feeder includes a plurality of cup holding tubes vertically arranged and spaced about a common circle. Each cup holding tube holds a plurality of stacked frusto-conical cups. Basically, the carousel feeder is rotated so that one stack of cups is supplied to the feeding assembly for the mandrel wheel. After that stack has been completely depleted, the carousel feeder is rotated again to supply another stack of cups to the feeding assembly of the machine, and so on. There is a two-fold problem, however, with the carousel feeder. First, a person must individually feed the cups by hand into each cup holding tube. This is burdensome and time-consuming, and is also difficult, since the cup holding tubes are positioned at a great height above the machine. Secondly, there is a delay in the operation of the machine when a new stack of cups must be fed to the feeding assembly thereof. In other words, before a new stack of cups is fed to the feeding assembly of the machine, the previous stack of cups must be completely depleted and supplied on the mandrel wheel.

Another known cup printing machine is that sold by Van Dam Machine Corporation under Model 560 IR. This machine also includes a mandrel wheel having eight mandrels spaced equally therearound. With this machine, a tray feeding elevator is provided having a plurality of steps in which stacks of horizontally oriented cups can be positioned. As the elevator moves upwardly, each horizontally oriented stack is moved upwardly. The uppermost stack is pushed through a long feed tube to the feeding assembly of the machine. However, this machine also suffers from various disadvantages. For example, the feed tube from the elevator to the feeding assembly must be extremely long and is provided with a substantially 90° bend. Because of the 90° bend, the tray feeding elevator must be much higher than would ordinarily be necessary in order to ensure that the bend is as gradual as possible. In addition, deeply nested, tall narrow cups, could not be used with this machine since they will not travel around the 90° bend of the tube.

Of course, in a machine such as the Model 560-L-120 machine sold by Van Dam Machine Corporation, the bend in the tube need not be as great and the tray feed elevator could be made smaller. However, this is because the mandrel wheel is provided with only six mandrels spaced therearound. Since only six mandrels are used, this machine is limited in other respects.

OBJECTS AND SUMMARY OF THE INVENTION

Accordingly, it is an object of the present invention to provide apparatus for supplying rows of stacked containers to a feeding assembly of a container decorating apparatus that avoids the aforementioned problems with the prior art.

It is another object of the present invention to provide apparatus for supplying rows of stacked containers to a feeding assembly of a container decorating apparatus in which there is no down time of the machine due to such supplying operation.

It is still another object of the present invention to provide apparatus for supplying rows of stacked containers to a feeding assembly of a container decorating apparatus in which individuals can easily feed the cups along a tray feeding elevator.

It is yet another object of the present invention to provide apparatus for supplying rows of stacked containers to a feeding assembly of a container decorating apparatus with minimal overhead room.

In accordance with an aspect of the present invention, apparatus is provided for supplying rows of stacked containers to a feeding assembly of a container decorating apparatus, the feeding assembly intermittently supplying each container on a respective mandrel assembly of a mandrel wheel of the container decorating apparatus, the apparatus including rotatable, hollow, crossed turret means for supplying a first row of stacked containers to the feeding assembly and for automatically supplying a subsequent row of stacked containers in stacked relation on the first row after a level of the first row has decreased to a first predetermined level and before a last container of the first row has been supplied on a respective mandrel assembly; sensing means for sensing when the level of the first row has decreased to the first predetermined level; rotating means for rotating the crossed turret means in response to the sensing means to supply the subsequent row of stacked containers in stacked relation on the first row of stacked containers; and supply means for intermittently supplying a row of stacked containers to the crossed turret means after a level of the subsquent row of stacked containers has decreased to a second predetermined level.

The above and other objects, features and advantages of the present invention will become readily apparent from the following detailed description thereof which is to be read in connection with the accompanying drawings.

DETAILED DESCRIPTION OF A PREFERRED EMBODIMENT

Figure 1:
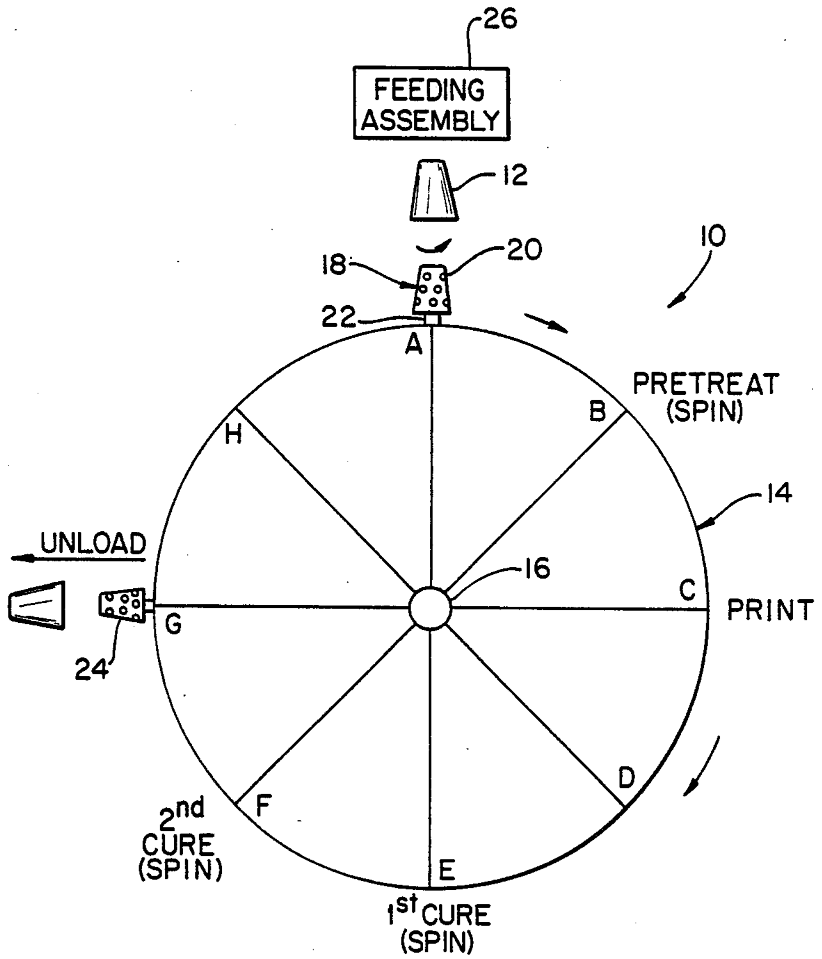
FIG. 1 is a schematic drawing of a tapered sidewall printer with which the present invention can be used.

Referring to the drawings in detail, and initially to FIG. 1, an intermittently operated decorating apparatus 10 with which the present invention can be used, for printing on the external surfaces of containers, such as frusto-conical cups 12, includes an intermittently rotatable mandrel wheel 14 rotatably mounted on a central shaft 16. A plurality of regularly spaced mandrel assemblies 18 are rotatably mounted at the circumferential periphery of mandrel wheel 14 and extend radially outward therefrom.

Each mandrel assembly 18 includes a container holding section 20 which essentially has a frusto-conical configuration to correspond to the configuration of cups 12. Each container holding section 20 is axially fixed on a shaft 22 which is rotatably mounted by any conventional means to the circumferential periphery of mandrel wheel 14 so as to extend radially outward therefrom. In addition, each container holding section 20 is formed with a plurality of apertures 24 on the external surface thereof which are in fluid communication with at least one conduit extending through the container holding section 20. Each conduit is in fluid communication at its opposite end with either a vacuum supply {not shown) or pressurized air supply (not shown), the reason for which will be readily apparent from the description which follows.

As shown, there are eight mandrel assemblies 18 rotatably mounted to mandrel wheel 14, although this number may be varied. Thus, in operation, a cup 12 is dropped from above by a feeding assembly 26 onto the mandrel assembly 18 at position A which is the loading station. At such time, a vacuum is applied through apertures 24 to firmly hold the cup 12 thereon. Mandrel wheel 14 is then rotated to the next position B, which is the pre-treatment station at which the outer surface of cup 12 is pre-treated with a gas flame or with an electric discharge in order to better adhere the ink at the next print station C. Each mandrel assembly 18 at pre-treatment station B is rotated by a mandrel rotation assembly (not shown) as disclosed in commonly assigned U.S. Pat. No. 4,722,271, issued on Feb. 2, 1988, the entire disclosure of which is incorporated herein by reference. The cup 12 is firmly held on the mandrel assembly 18 at pre-treatment station B by means of a vacuum applied through apertures 24, and is also caused to rotate, so as to provide an even pre-treatment along the entire external surface of cup 12.

Mandrel wheel 14 is then rotated to print station C, where a printing blanket contacts the cup 12 thereat, and causes it to rotate, thereby printing on the external surface thereof. During the next intermittent step, mandrel wheel 14 is moved so that cup 12 is moved to position D, which is a dead station, that is, no action occurs there. At the next position E which is a first cure station, the ink is cured or dried by ultraviolet light. Each mandrel assembly 18 is rotated or spun during the curing operation at position E. At position F, a second cure by ultraviolet light occurs, with mandrel assembly 18 again being rotated or spun, whereby cup 12 thereat is also rotated or spun.

At unloading station G, cup 12 is unloaded from the respective mandrel assembly 18. Specifically, the vacuum applied to apertures 24 is released, and an air blast from the pressurized air supply (not shown}blows the cup off the mandrel assembly 18 in the direction of the arrows shown, to a collecting device, generally through a tube.

The present invention is generally concerned with apparatus for supplying rows of stacked containers to feeding assembly 26 of apparatus 10. Specifically, apparatus for supplying rows of stacked containers according to the present invention generally includes a crossed turret 28 (FIGS. 6 and 7) which supplies rows 30 of stacked cups 12 to feeding assembly 26, a pusher assembly 32 (FIGS. 2–6) which intermittently pushes rows 30 of cups 12 into crossed turret 28, and a tray feeding elevator 34 which supplies the rows 30 to pusher assembly 32.

Figure 6:
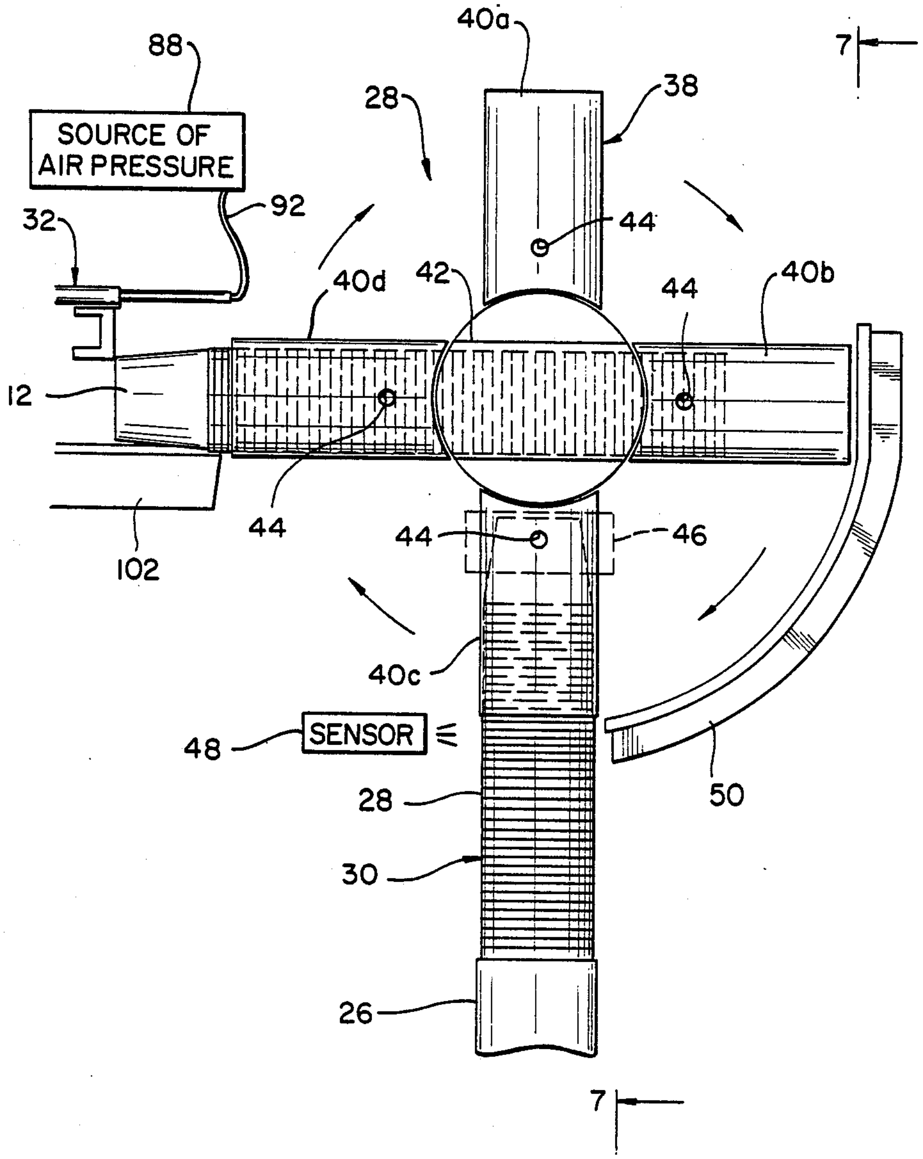
FIG. 6 is a front elevational view of the crossed turret of the apparatus according to the present invention.

With reference first to FIG. 6, crossed turret 28 includes an outer turret section 38 comprised of four radially oriented tubes *40a–40d* equidistantly spaced about a center point and connected to each other, and a central tubular section 42 positioned centrally within outer turret section 36. As will be explained in greater detail hereinafter, outer turret section 38 and central tubular section 42 are arranged to rotate together and independently with respect to each other.

Each tube *40a–40d* includes a hole 44 at the same position therealong and at the front side of crossed turret 28. A sensor 46 is positioned, as shown in FIG. 6, in front of the hole 44 of the tube *40a–40d* which is at the lowermost vertical position of crossed turret 28. In FIG. 6, this is tube *40c*. Sensor 46 is a conventional sensor which shines light through the respective hole 44 and detects the amount of reflected light. In this regard, since cups 12 have a white or lighter color and outer turret section 38 has a black color, sensor 46 determines whether the cups 12 in the leg *40c* shown in FIG. 6, have fallen to a level below hole 44, which constitutes a predetermined level. In like manner, a sensor 48 of substantially identical construction as sensor 46, is positioned just below tube *40c* of crossed turret 28, when the latter is in the position shown in FIG. 6. Sensor 48 determines when the cups 12 have fallen to a level below the lowermost edge of tube *40c*. In this regard, a black background can be provided in opposing relation to sensor 48 on the opposite side of cups 12.

As also shown in FIG. 6, a guideway 50 extends in a curvilinear manner from the end of tube *40b* to a position just before tube 40c, and functions to prevent the escape of cups 12 from tube 40b when it travels to the position of tube 40c.

Figure 9A:
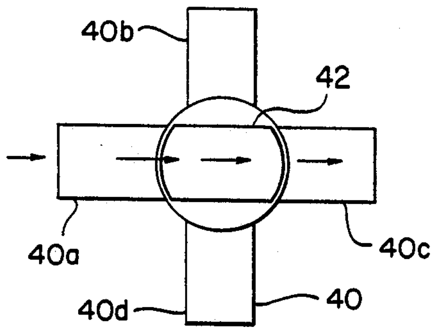
FIGS. 9A–9D are schematic views of the crossed turret of FIG. 6, showing the same in the different modes of operation.
Figure 9B:
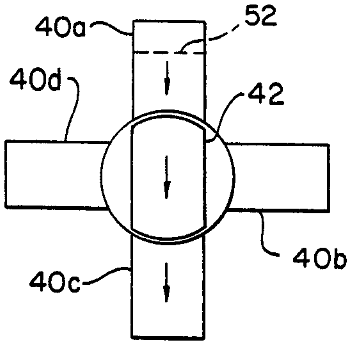
Figure 9C:
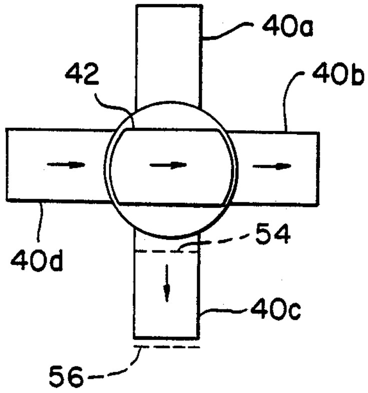
Figure 9D:
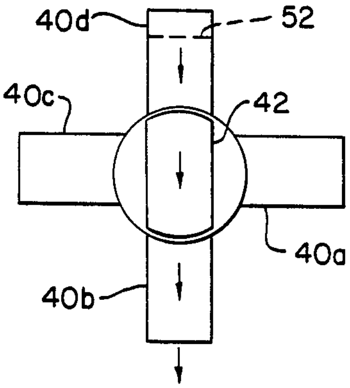

In general operation of crossed turret 28, reference will now be made to FIGS. 9A–9D. As shown in 9A, initially, central tubular section 42 is in horizontal alignment with tubes 40a and 40c. In such position, a row 30 of cups 12 is pushed therethrough, as shown by the arrows in FIG. 9A. Then, as shown in FIG. 9B, outer turret section 38 and central tubular section 42 are rotated clockwise 90° together, whereupon the row of cups becomes vertically oriented and is supplied to feeding assembly 26 of apparatus 10. At this time, the level of row 30 is indicated by line 52. As cups 12 are intermittently supplied by feeding assembly 26 onto mandrel assemblies 18, level 52 begins to fall. When the level of the cups falls to a predetermined level 54, as shown in FIG. 9C, and as detected by sensor 46 through the respective hole 44, central tubular section 42 is rotated 90° either counter-clockwise or clockwise, so as to be in line with tubes 40b and 40d, whereupon another row 30 of cups 12 is pushed therethrough, as indicated by the arrows. When the level of the vertical row of cups in tube 40c of FIG. 9C falls to a level 56 below the free end of tube 40c as detected by sensor 48, outer turret section 38 and central tubular section 42 are again rotated clockwise together by 90° as shown in FIG. 9D. In such position, the row 30 of cups 12 positioned within tubes 40b and 40d and central tubular section 42 is stacked on top of the previous row 30 of cups 12 which had fallen below level line 56. The level of the new row 30 of cups 12 is again at level line 52 (FIG. 9D), and the process is repeated continuously thereafter. It will be appreciated from this disclosure that there is no need to wait until feeding assembly 26 has supplied all of the previous row of cups to the mandrel assemblies, as with the carousel feeder, until new cups are supplied thereto. In addition, there is no need to worry about any 90° bend since crossed turret 28 provides for a 90° rotation.

Figure 7:
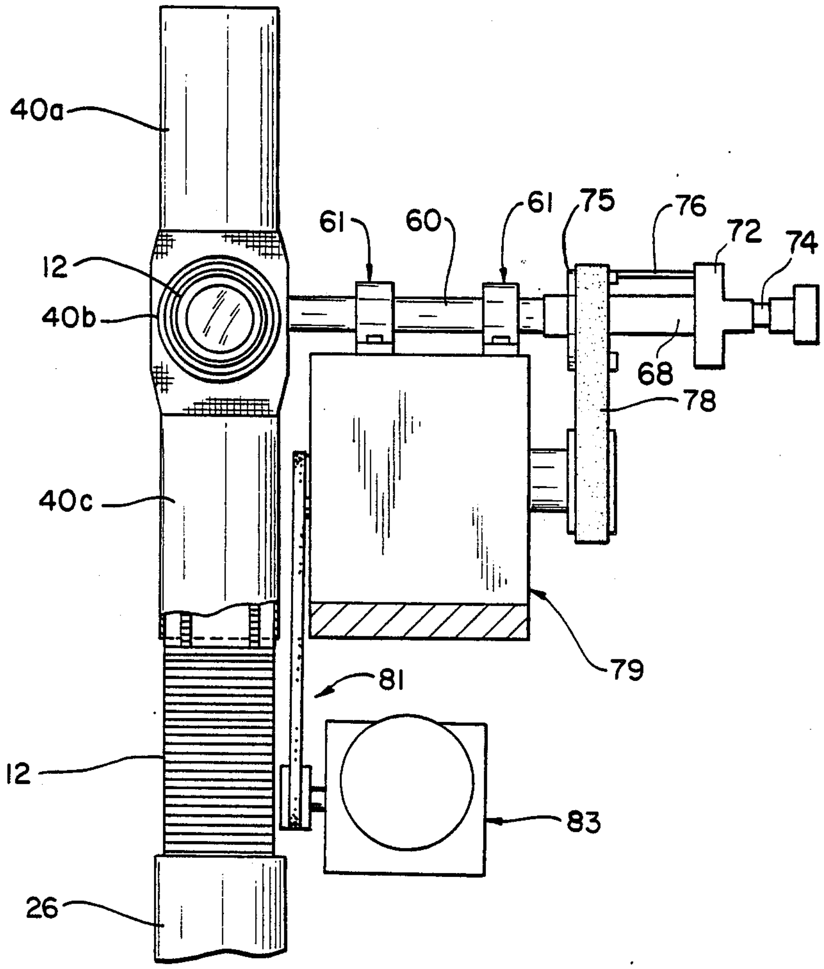
FIG. 7 is a cross-sectional view of the apparatus of FIG. 6, taken along line 7—7 thereof.
Figure 8:
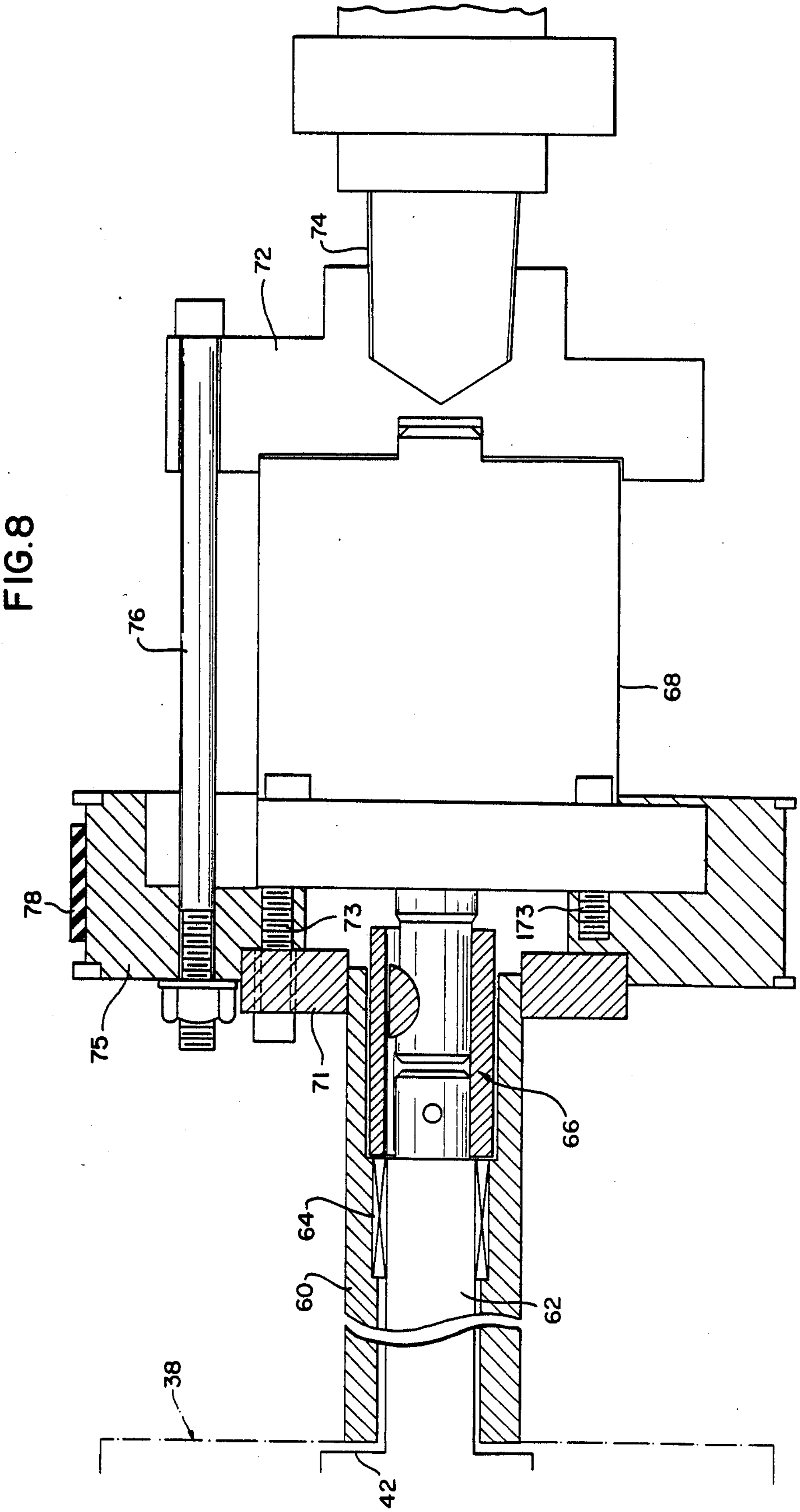
FIG. 8 is a partial cross-sectional view of the drive assembly for the crossed turret of FIG. 6.

As shown in FIGS. 7 and 8, the drive assembly 58 for crossed turret 28 includes an outer tubular shaft 60 connected at one end to outer turret section 38, and an inner shaft 62 rotatably positioned within outer tubular shaft 60 by bearing assemblies 64, inner shaft 62 being connected at one end thereof to central tubular section 42. In this manner, since outer and inner shafts 60 and 62 can rotate with respect to each other, outer turret section 38 and central tubular section 42 can be rotated independently of each other, as explained above with respect to FIGS. 9A–9D. Outer shaft 60 is rotatably supported by a bearing assembly 61. Inner shaft 62 is connected through a coupling 66 to a rotary actuator 68 which may be an air cylinder sold under the Trademark "ROTAC", Model number S-250-2 by Ex-Cell-0 Corp., 945 East Sater St., Greenville, Ohio 45331. An outer flange 71 of outer tubular shaft 60 is connected to a timing belt sprocket 75 by a bolt 73. The outer housing of rotary actuator 68 is connected to timing belt sprocket 75 by a bolt 173. Timing belt sprocket 75 is further connected to an air manifold 72 by a socket head cap screw 76, and a rotating air union 74 is mounted to air manifold 72 for supplying air to rotary actuator 68. Further, timing belt sprocket 75 is rotated by a belt 78 by means of a Camco 90° indexer 79 which in turn is rotated by a belt 81 therearound by means of a motor 83 controlled by sensor 48. As timing belt sprocket 75 is caused to rotate by belt 78, manifold 72 and rotary actuator 68 also rotate, whereupon outer tubular shaft 60 is also caused to rotate, whereby outer turret section 38 rotates by 90° as aforementioned with respect to FIGS. 9A–9D.

Rotary actuator 68 includes an internal mechanism (not shown) which is well known and which is connected to inner shaft 62 through coupling 66, whereupon inner shaft 62 can be rotated with outer tubular shaft 60 or independently thereof. In accordance with the present invention, inner shaft 62 is rotated together with outer tubular shaft 60 when sensor 48 senses that the level of the cups has fallen to a level below level 56, whereupon sensor 48 actuates motor 83 which drives belt 81 which, in turn, drives the input shaft of Camco indexer 79 which rotates the output shaft thereof 90° so as to drive belt 78. This causes rotary actuator 68 to rotate by means of timing belt sprocket 75, and causes inner shaft 62 to rotate with rotary actuator 68 and outer shaft 60. On the other hand, when sensor 46 senses that the level of the cups has fallen to a level below level 54, sensor 46 supplies a signal only to rotary actuator 68 to cause only inner shaft 62 to rotate, thereby only rotating central tubular section 42. Specifically, air union 74 supplies air to rotary actuator 68, in a well-known manner, to cause only inner shaft 62 to rotate.

Referring now to FIGS. 2–6, pusher assembly 32 will now be described. As shown, a support bar 80 is supported in horizontal relation by a support structure 82. The end of support bar 80 remote from crossed turret 28 has a connecting end 84 which supports a cylinder assembly 86 of pusher assembly 32 in horizontal and parallel relation to support bar 80. Cylinder assembly 86 extends at its opposite end to the edge of crossed turret 28, as shown in FIG. 6. Cylinder assembly 86 is preferably a hollow bar and has a magnet (not shown) slidable therein. A source 88 of air or hydraulic pressure is connected to one end of cylinder assembly 86 by a line 90 and is connected to the opposite end of cylinder assembly 86 via a line 92. In this manner, the magnet within cylinder assembly 86 can be forced from one side to the other by source 88. A metal yoke 94 surrounds cylinder assembly 86 and is slidable therealong. Basically, yoke 94 is made of a material which is attracted to the magnet within cylinder assembly 86. Thus, as the magnet within cylinder assembly 86 travels therein, it pulls yoke 94 along with it by the magnetic coupling. Cylinder assemblies 86 of this type are sold by Festo Corporation, 395 Moreland Road, Hauppauge, N.Y., as double-acting rodless cylinders under Model Nos. DGO-16, DGO-25 and DGO-40.

Pusher assembly 32 also includes a U-shaped pusher member 96 having its connecting leg oriented vertically. Pusher member 96 has another leg pivotally connected to yoke 94 by a shaft 98, with a coil spring 100 for normally biasing pusher member 96 to the position shown in FIGS. 3 and 4 and shown by the solid line in FIG. 5. If yoke 94 is out of line when a row 30 of cups 12 is supplied to pusher assembly 32, U-shaped pusher member 96 rotates, as shown by the dashed lines in FIG. 5 so that no damage is caused to pusher assembly 32 or cups 12.

Figure 2:
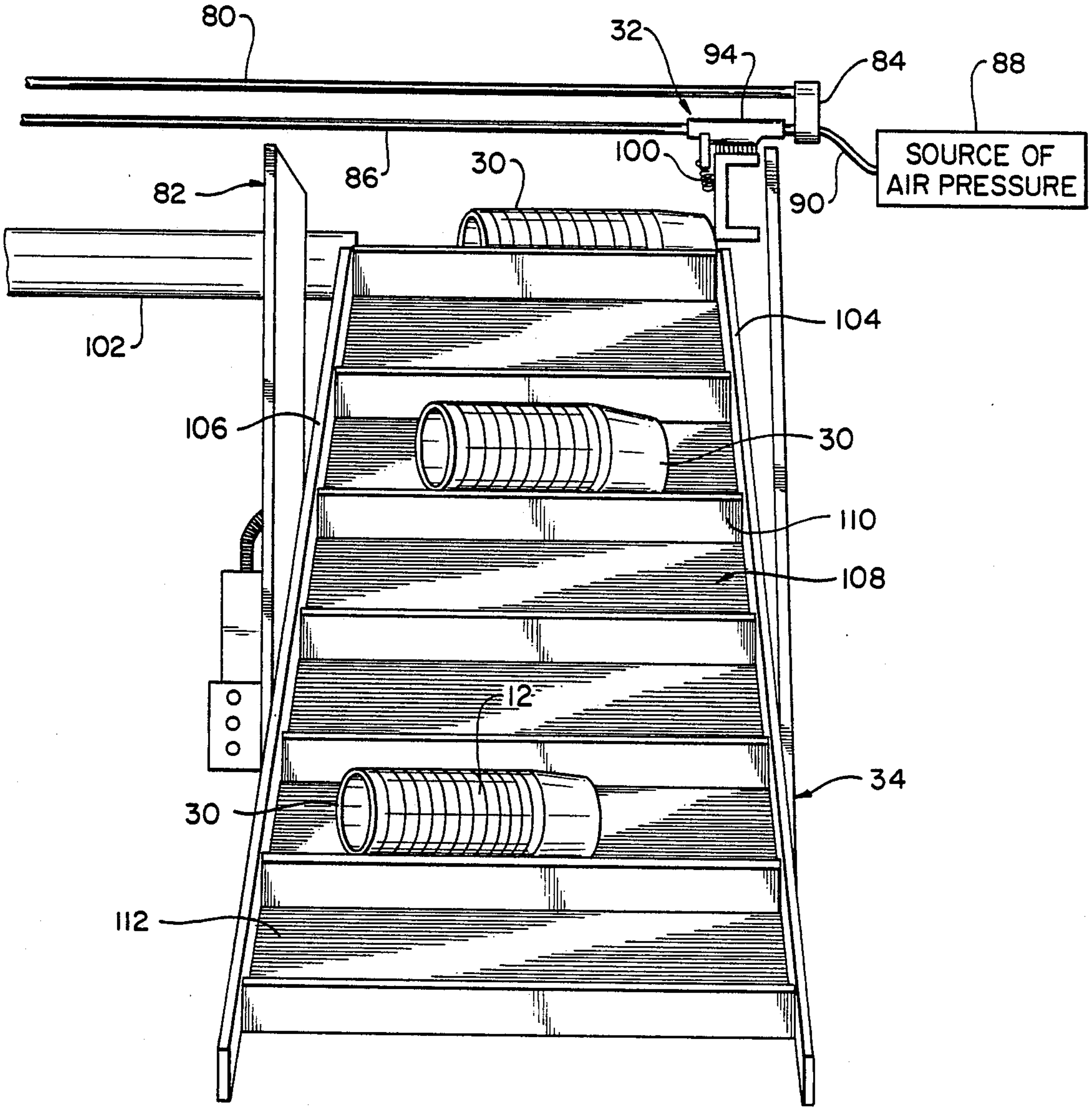
FIG. 2 is a perspective view of a tray feeding elevator and pusher assembly of the apparatus according to the present invention.
Figure 3:
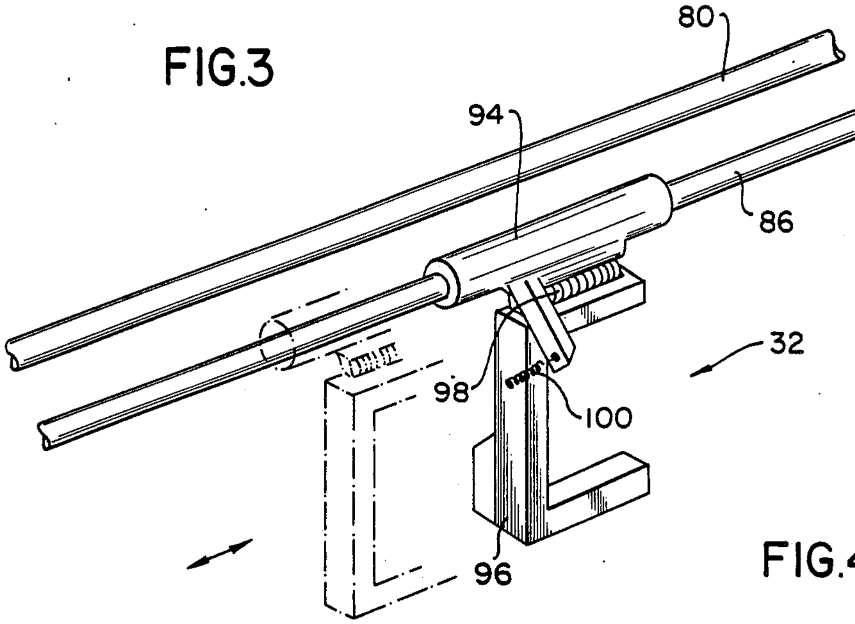
FIG. 3 is an enlarged perspective view of the pusher assembly of FIG. 2.
Figure 4:
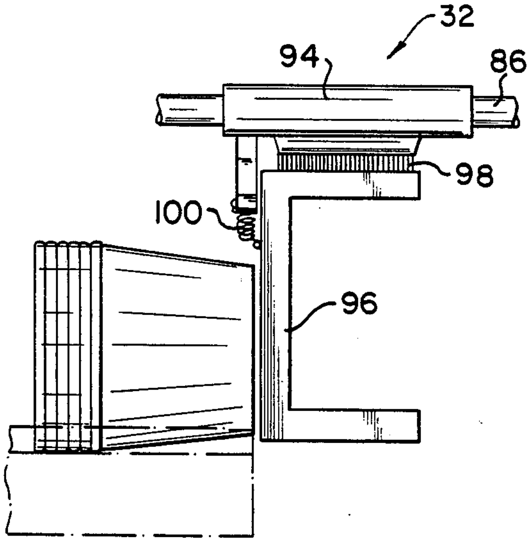
FIG. 4 is a side plan view of the pusher assembly of FIG. 3, showing the same in operation.
Figure 5:
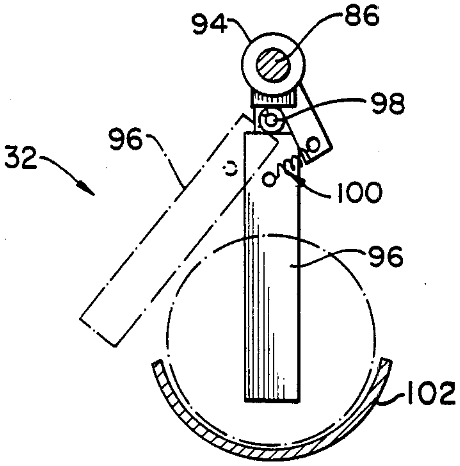
FIG. 5 is an end elevational view of the pusher assembly of FIG. 3.

As shown in FIGS. 2, 5 and 6, pusher assembly 32 pushes each row 30 of cups 12 from tray feeding elevator 34 along a pusher trough 102 having an arcuate shape. Pusher trough 102 extends to the edge of the upper end of tray feeding elevator 34 (FIG. 2) to a point immediately in front of the respective horizontally oriented tube 40a–40d at such time. In FIG. 6, this is tube 40*d*. Thus, pusher assembly 32 pushes each row 30 of cups 12 along pusher trough 102 into outer turret section 38, as shown in FIG. 6.

Referring now to FIG. 2, tray feeding elevator 34 includes side guides 104 and 106 extending at an angle upwardly to a height substantially equal to pusher trough 102. An endless conveyor belt 108 is wrapped about two rollers (not shown), one at the upper end and one at the lower end thereof, with one of the rollers being rotated by a suitable motor (not shown) as is well known in the art. Tray slats 110 are secured to conveyor belt 108 transverse to the direction of movement thereof and parallel to each other so as to define a plurality of cup holding trays 112, whereby one row 30 of cups 12 can be arranged horizontally in each cup holding tray 112, as shown in FIG. 2. Conveyor belt 108 is moved intermittently so that each row 30 of cups 12 is intermittently moved to the uppermost cup holding tray 112. It will be appreciated that the conveyor belt 108 at the uppermost cup holding tray 112 is in line with the bottom of pusher trough 102. In this manner, when a new row of cups is brought to the uppermost position of tray feeding elevator 34, pusher assembly 32 is used to push such row 30 from the uppermost cup holding tray 112 to pusher trough 102 and then to outer turret section 38.

In operation, and further to the operation already described with respect to FIGS. 9A–9D, when sensor 46 detects that the row of cups in the respective tube 40*a*–40*d* is below level 54, it sends a signal to rotary actuator 68 which rotates central tubular section 42 back to its horizontally oriented position. The signal from sensor 46 is also supplied to source 88 of pressure to supply pressure through line 90 to move the magnet within slide bar 86 toward crossed turret 28. This, in turn, moves pusher assembly 32 therealong which, in turn, pushes the uppermost row 30 of cups 12 along pusher trough 102 into crossed turret 28, as shown in FIG. 6. Then, pusher assembly 32 is moved back to the position shown in FIG. 2 by means of the magnet within slide bar 86, that is, by means of pressure line 92 and conveyor belt 108 is intermittently moved so that the row 30 of cups 12 in the next cup holding tray 112 is moved to the uppermost position of tray feeding elevator 34. When sensor 48 senses that the level of cups 12 in the respective tubes 40*a*–40*d* is less than the predetermined level 56, it sends a signal to the motor which drives belt 78 and the entire crossed turret 28, that is, both outer turret section 38 and central tubular section 42 are rotated clockwise by 90° together so that the row 30 of cups 12 which had previously been pushed into crossed turret 28 by pusher assembly 32 is stacked on top of the row 30 of cups 12 which just passed sensor 48. The cups are thereby continuously fed to feeding assembly 26. When the level of this last row 30 of cups 12 falls below the level determined by sensor 46, the operation repeats itself. In this manner, there is never any delay in the feeding of cups to the mandrels 18. Further, it is very easy to supply the cups to the feeding assembly. In addition, there is no need for any large overhead assembly to supply the cups to feeding assembly 26.

Having described a specific preferred embodiment of the invention with reference to the accompanying drawings, it will be appreciated that the present invention is not limited to that precise embodiment, and that various changes and modifications can be effected therein by one of ordinary skill in the art without departing from the spirit or scope of the invention as defined in the appended claims.

What is claimed is:

1. Apparatus for supplying rows of stacked containers to a feeding assembly of a container decorating apparatus, said feeding assembly intermittently supplying each container on a respective mandrel assembly of a mandrel wheel of the container decorating apparatus, said apparatus for intermittently supplying comprising:
   - rotatable, hollow, crossed turret means for supplying a first row of stacked containers to said feeding assembly and for automatically supplying a subsequent row of stacked containers in stacked relation on said first row after a level of said first row has decreased to a lower predetermined level and before a last container of said first row has been supplied on a respective mandrel assembly;
   - sensing means for sensing when the level of said first row has decreased to said lower predetermined level;
   - rotating means for rotating said crossed turret means in response to said sensing means to supply said subsequent row of stacked containers in stacked relation on said first row of stacked containers; and
   - supply means for intermittently supplying a row of stacked containers to said crossed turret means after a level of said subsequent row of stacked containers had decreased to a higher predetermined level which is above said lower predetermined level.

2. Apparatus according to claim 1; wherein said crossed turret means includes an outer turret section formed by four radially oriented and equiangularly spaced hollow tubes connected together, and a central tube positioned centrally within said outer turret section.

3. Apparatus for supplying rows of stacked containers to a feeding assembly of a container decorating apparatus, said feeding assembly intermittently supplying each container on a respective mandrel assembly of a mandrel wheel of the container decorating apparatus, said apparatus for intermittently supplying comprising:
   - rotatable, hollow, crossed turret means for supplying a first row of stacked containers to said feeding assembly and for automatically supplying a subsequent row of stacked containers in stacked relation on said first row after a level of said first row has decreased to a lower predetermined level and before a last container of said first row has been supplied on a respective mandrel assembly, said crossed turret means including an outer turret section formed by four radially oriented and equiangularly spaced hollow tubes connected together, and a central tube positioned centrally within said outer turret section;
   - sensing means for sensing when the level of said first row has decreased to said lower predetermined level;
   - rotating means for rotating said crossed turret means in response to said sensing means to supply said subsequent row of stacked containers, said rotating means including first means for rotating said outer turret section and second means for rotating said central tube such that said central tube is always rotated into alignment with two of said tubes of said outer turret section; and
   - supply means for intermittently supplying a row of stacked containers to said crossed turret means after a level of said subsequent row of stacked containers has decreased to a higher predetermined level which is above said lower predetermined level.

4. Apparatus according to claim 3; wherein said second rotating means includes a first shaft connected to said central tube, and rotary actuator means for rotating said first shaft; and said first rotating means includes a second, hollow shaft rotatably mounted around said first shaft, and indexer and motor driven means for rotating said second shaft.

5. Apparatus according to claim 4; wherein said sensing means includes first sensor means for sensing when the level of the first row has decreased to said lower predetermined level and for supplying an actuating signal to the indexer and motor driven means to cause the outer turret section and central tube to rotate together by 90° ; and a second sensor for detecting when the level of said subsequent row has decreased to said higher predetermined level and for supplying an actuating signal to said rotary actuator in response thereto to cause said rotary actuator to rotate said central tube through said shaft by 90° with respect to said outer turret section.

6. Apparatus according to claim 1; further including tray feeding elevator means for intermittently supplying horizontally oriented rows of containers to an uppermost position; pusher trough means for connecting said uppermost position of said tray feeding elevator means with said crossed turret means; and pusher means for pushing the row of containers at the uppermost position of said tray feeding elevator means along said pusher trough means and into said crossed turret means.

7. Apparatus according to claim 6; wherein said elevator means is comprised of an intermittently movable endless conveyor belt, and a plurality of transverse tray slats secured to said conveyor belt for defining cup holding trays, each cup holding tray holding a row of containers.

* * * * *